United States Patent [19]

Gioutsos

[11] Patent Number: 5,739,757
[45] Date of Patent: Apr. 14, 1998

[54] VEHICLE PASSENGER WEIGHT SENSOR

[75] Inventor: Tony Gioutsos, Brighton, Mich.

[73] Assignee: Breed Automotive Technology, Inc., Lakeland, Fla.

[21] Appl. No.: 792,180

[22] Filed: Jan. 30, 1997

[51] Int. Cl.⁶ .................................................. G08B 21/00
[52] U.S. Cl. .......................... 340/667; 340/665; 340/666; 280/735
[58] Field of Search ................................ 340/665, 666, 340/667; 200/85 R, 85 A; 180/273; 280/734, 735

[56] References Cited

U.S. PATENT DOCUMENTS

| | | | |
|---|---|---|---|
| 3,321,663 | 5/1967 | Poznik | 340/667 |
| 3,672,699 | 6/1972 | De Windt | 280/735 |
| 4,361,741 | 11/1982 | Leskoverc et al. | 200/85 |
| 4,509,614 | 4/1985 | Bando et al. | 180/273 |
| 4,607,199 | 8/1986 | Krueger et al. | 318/484 |
| 4,633,237 | 12/1986 | Tucknott et al. | 340/573 |
| 4,655,313 | 4/1987 | Hicks | 180/273 |
| 4,659,108 | 4/1987 | Sack et al. | 280/807 |
| 4,678,058 | 7/1987 | Wooters | 180/273 |
| 4,806,713 | 2/1989 | Krug et al. | 200/85 |
| 5,109,945 | 5/1992 | Koga | 180/273 |
| 5,120,980 | 6/1992 | Fontaine | 307/16.1 |
| 5,161,820 | 11/1992 | Vollmer | 280/730 |
| 5,164,709 | 11/1992 | Lamberty et al. | 340/667 |
| 5,232,243 | 8/1993 | Blackburn et al. | 280/735 |
| 5,413,378 | 5/1995 | Steffens, Jr. et al. | 280/735 |
| 5,439,249 | 8/1995 | Steffens, Jr. et al. | 280/735 |
| 5,454,591 | 10/1995 | Mazur et al. | 280/735 |
| 5,466,001 | 11/1995 | Gotomyo et al. | 280/730 |
| 5,474,327 | 12/1995 | Schousek | 280/735 |
| 5,481,078 | 1/1996 | Asche | 200/85 |
| 5,494,311 | 2/1996 | Blackburn et al. | 280/735 |
| 5,570,903 | 11/1996 | Meister et al. | 280/735 |
| 5,580,084 | 12/1996 | Gioutsos | 280/735 |
| 5,605,348 | 2/1997 | Blackburn et al. | 280/735 |
| 5,618,056 | 4/1997 | Schoos et al. | 280/735 |

FOREIGN PATENT DOCUMENTS

| | | |
|---|---|---|
| 0721863 | 12/1995 | European Pat. Off. |
| 0728636 | 2/1996 | European Pat. Off. |

OTHER PUBLICATIONS

Kwun et al., "Nondestructive measurement of stress in ferromagnetic steels suing harmonic analysis of induced voltage", *DNC International*, vol. 20, No. 3, Jun. 1987 relates to a method for nondestructively meaasurieng mechanical stresses in ferromagnetic steels by applying a sinusoidal magnetic field to the materials and analyzing the harmonic content of the resulting voltage induced in a sensing coil.

*Primary Examiner*—Jeffery Hofsass
*Assistant Examiner*—Sihong Huang
*Attorney, Agent, or Firm*—Lonnie Drayer

[57] ABSTRACT

A vehicle safety system having crash detection circuitry and an airbag adjacent a vehicle seat further includes a system for determining the weight of a passenger on the vehicle seat. If the detected weight of the passenger does not exceed a predetermined weight threshold, the airbag is disabled. A forward sensor and a rear sensor are mounted in a vehicle seat adjacent a ferromagnetic structure element in the seat. The sensors measure strain on the ferromagnetic element, which is proportional to weight on the vehicle seat. A comparison of the measurements of the two sensors also provides an indication of the position of the passenger on the vehicle seat, such that the airbag may be disabled if the passenger is sitting too close to the airbag. Each of the sensors preferably comprises an electromagnet generating an oscillating magnetic field of a known frequency and a coil. Strain on the ferromagnetic element alters the magnetic field and such strain is detected by the coil. The detected change in the magnetic field is proportional to the weight of the passenger.

15 Claims, 3 Drawing Sheets

VEHICLE PASSENGER WEIGHT SENSOR

BACKGROUND OF THE INVENTION

The present invention relates to an improved system and method for detecting the weight of a person or thing seated within a motor vehicle, as may be useful in controlling actuation of a vehicle safety device such as a vehicle air bag.

Current vehicles include an airbag for the driver as well as the front seat passenger. The danger that the passenger side airbag poses to infants in carseats and small children as well as small adults has been well documented. Manufacturers have sought to develop systems which would disable the passenger side airbag if the weight on the passenger seat is below a given threshold, thereby indicating either the presence of an individual for whom the airbag would be dangerous or the absence of any passenger at all.

In accordance with one prior art approach, a measure representative of the weight of a person or thing seated within a motor vehicle is obtained by detecting the resulting change in the resistance of a pair of superimposed wire grids embedded within the seat cushion. Specifically, the weight of the person or thing situated upon the vehicle's seat serves to alter the relative spacing between the grids in such a manner as to provide a change in detected resistance which may be roughly correlated with the object's weight. Unfortunately, this prior art design suffers from substantial cost, with the representative measure being of limited resolution, and with an unacceptable susceptibility to variation in nominal grid resistance responsive to changes in system temperature. Moreover, use of the wire grids under this approach further imposes substantial constraints upon both seat design and the techniques available for its manufacture.

In accordance with a second prior art approach, a bladder is located within the lower seat cushion, along with a sensor which senses the pressure of a fluid contained within the bladder. For example, where the fluid within the bladder is air, a piezoresistive pressure sensor is used to generate, upon loading of the seat cushion, an output signal representative of the relative increase in bladder air pressure which, after suitable signal processing, roughly correlates with object weight. Unfortunately, under this second approach, variation in system temperature affects both the operation of the piezoresistive pressure sensor and the air pressure within the bladder, while component aging serves to degrade system performance over time, resulting in a substantial reduction in system reliability, as well as reduced resolution. Finally, as with the first prior art approach mentioned above, use of the bladder again imposes substantial design and manufacturing constraints.

What is needed, then, is a low-cost weight sensor for use in detecting the weight of an object placed upon a vehicle's seat which may be readily incorporated within the design of the seat while otherwise providing consistent, reliable weight information.

SUMMARY OF THE INVENTION

The present invention provides an improved system and method for generating a signal representative of the weight of a person or thing seated within a motor vehicle, as may be useful in controlling actuation of a vehicle safety device such as a vehicle air bag, which overcomes the above-described disadvantages of the prior art.

In accordance with the present invention, a system for generating a signal representative of the weight of a person or thing seated within a motor vehicle includes a ferromagnetic element positioned within the structure of a seat such that an elastic strain is induced therein responsive to the mechanical loading of the seat by the person or thing seated thereupon. This elastic strain in turn produces a change in the ferromagnetic properties of the ferromagnetic element, in accordance with the inverse-magnetostrictive or "Villari" effect.

The system also includes a magnet mounted on the vehicle adjacent to the ferromagnetic element for generating a magnetic field such that the ferromagnetic element falls within the magnetic field, with the field being influenced by strain-induced changes in the ferromagnetic properties of the ferromagnetic element. In this manner, the magnetic field will vary upon propagation of the elastic strain waves through the ferromagnetic element. The magnet can be a permanent magnet or an electromagnet including an exciting coil and a function generator capable of generating exciting current of known profile, such as a sinusoid, through the exciting coil.

The system further includes an inductor, such as a coil, for detecting variations in the magnetic field. The coil is mounted on the vehicle adjacent to the ferromagnetic element and the magnet such that changes in the magnetic field induce an electromotive force voltage in the coil. In this manner, the coil may be used to detect variations in the magnetic field caused by strain in the ferromagnetic element.

The system further includes a signal processor receiving the electromotive force voltage induced in the coil. In passive mode, the signal processor generates a signal when the detected variation in the magnetic field, as represented by the electromotive force voltage, exceeds a first threshold, thereby indicating sufficient weight on the seat surface. A vehicle safety system actuator is the trigger enabled by signal from the signal processor.

In active mode, the magnet preferably comprises an electromagnet including an exciting coil and a function generator. The signal processor receives the electromotive force voltage induced in the induction coil and preferably analyzes the third harmonic of the oscillating magnetic field. When the amplitude of the third harmonic exceeds a certain threshold, the signal processor indicates sufficient weight on the seating surface and enables the actuator.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
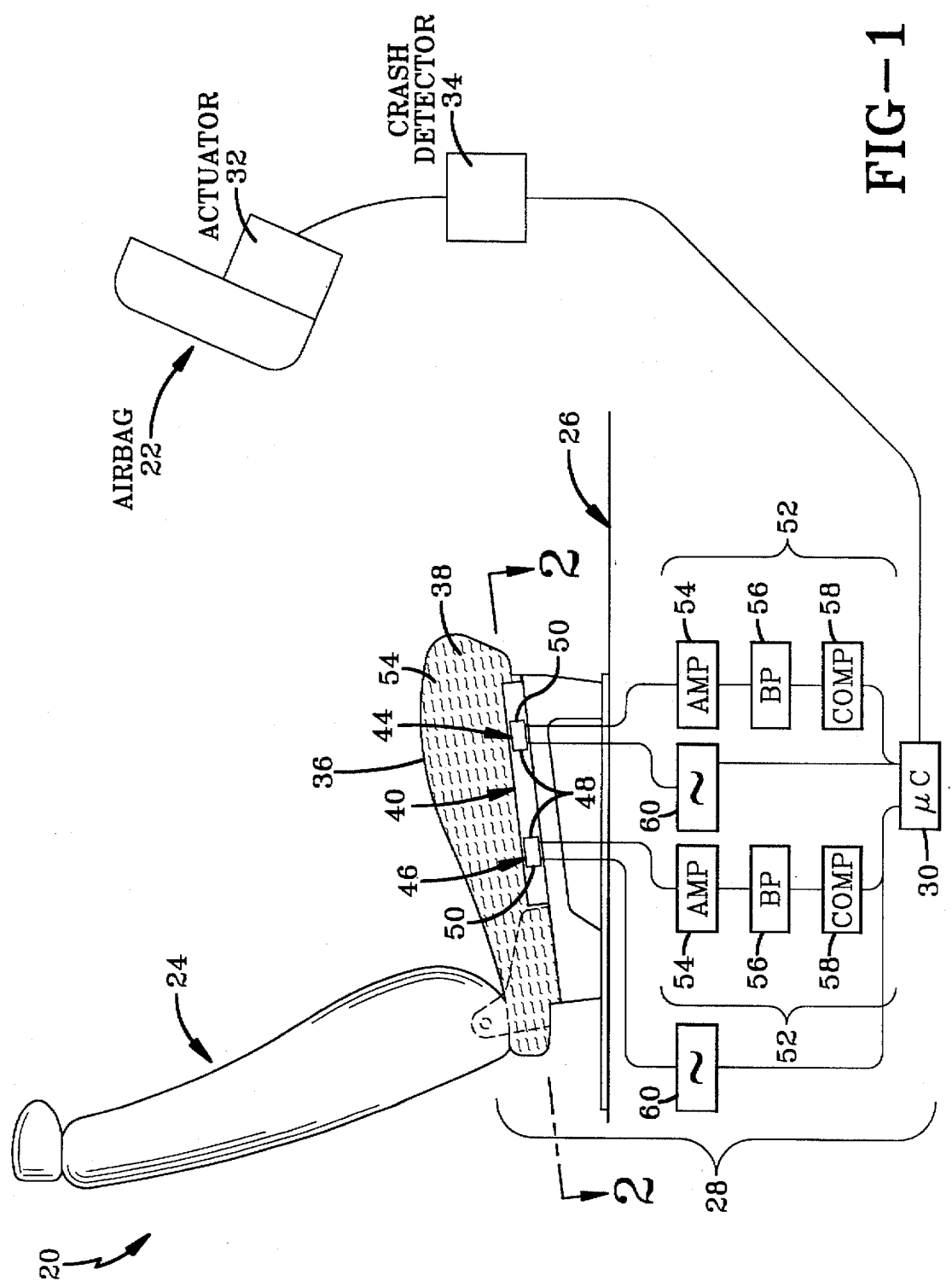
FIG. 1 is a schematic for the vehicle safety system of the present invention.

A vehicle safety system 20 according to the present invention is shown in FIG. 1 generally comprising a vehicle safety device 22, such as an airbag 22, installed forward of a vehicle seat 24 in a vehicle 26. The airbag 22 is shown installed forward of the vehicle seat 24 for illustrative purposes only, as side airbags are also well known, as are other vehicle safety devices 22 which would be installed adjacent an associated vehicle seat 24.

The vehicle safety system 20 further generally comprises a weigh system 28 measuring the weight on the vehicle seat 24. A microcontroller 30 controls operation of the vehicle safety system 20 based upon information from the weigh system 28. The airbag 22 includes an actuator 32 and crash detection circuitry 34, such as is well known in the airbag art.

The vehicle seat 24 includes a seating surface 36 over a foam cushion 38. The foam cushion 38 is supported by a support structure including at least one ferromagnetic element 40, such as a wire.

The weigh system 28 preferably includes a forward sensor 44 measuring weight on a forward portion of the seating surface 36 and a rearward sensor 46 measuring weight on a rearward portion of the seating surface 36. As used herein, the terms "forward" and "rearward" refer to the position of the sensors 44, 46 relative to the airbag 22, such that the forward sensor 44 is closer to the airbag 22 than the rearward sensor 46. In the example of a forwardly positioned airbag 22, this would correspond to forward and rearward in the vehicle 26.

Each sensor 44, 46 comprises a magnet 48 adjacent the ferromagnetic element 40 in the seat 24, such that the ferromagnetic element 40 lies within the magnetic field of the magnet 48. The magnet 48 can be a permanent magnet but is preferably an electromagnet. Each sensor 44, 46 further includes a coil 50 also positioned adjacent the ferromagnetic element 40.

Signal processors 52, preferably including an amplifier 54, a band pass filter 56 and a comparator 58, receives a signal from each coil 50. Preferably, a function generator 60 excites the magnet 48 with a known function of a known frequency.

In operation, the magnet 48 in each sensor 44, 46 preferably generates a sine wave magnetic field preferably between 100–50 kHz which is received by the ferromagnetic element 40, thereby causing magnetic induction in the ferromagnetic element. An electromotive force voltage is induced in the coil 50 by the magnetic induction and received by the signal processor 52. The signal is amplified by the amplifier 54 and filtered by the band pass filter 56. Preferably, the band pass filter 56 passes the third harmonic of the frequency of the magnetic field generated by the magnet 48. For example, for a magnet 48 generating a sinusoidal magnetic field at 10 kHz, the band pass filter 56 preferably sends the signal representing the 30 kHz component to the comparator 58, where the magnitude of that signal is compared to a given threshold. When a weight, such as a passenger, is placed upon the seating surface 36 of the vehicle seat 24, the weight is transmitted through the seating surface 36, foam cushion 38 to the ferromagnetic element 40, thereby inducing strain in the ferromagnetic element 40. The strain in the ferromagnetic element 40 alters the magnetic field and the electromotive force voltage generated by the coil 50. By measuring the amplitude of the third harmonic of the signal generated by the coil 50, the weight upon the seating surface 36 can be determined and indicated to the microcontroller 30.

The actuation of the airbag 22 is altered in several ways based upon information from the sensors 44, 46. First, if the total weight measured by the sensors 44, 46 does not exceed the predetermined threshold, the microcontroller 30 disables the vehicle safety device 22. Therefore, even if the crash detection circuitry 34 indicates a crash of sufficient magnitude, the actuator 32 will not activate the airbag 22. Alternatively, the microcontroller 30, based upon the total weight measured by the sensor 44, 46 could alter the activation of the airbag 22 by the actuator, such as reducing the speed of deployment of the airbag 22 when a passenger of lower weight is detected. Further, based upon the difference in the measured weight between the forward sensor 44 and the rearward sensor 46, the microcontroller 30 can determine the appropriate position of the passenger on the seating surface 36 relative to the airbag 22. If the microcontroller 30 determines that the passenger is seated on the forward portion of the seating surface 36, (i.e. too close to the airbag 22), the microcontroller disables actuation of the airbag 22 or alters the deployment of the airbag 22, such as reducing the speed of deployment.

Alternatively, if the magnets 48 are permanent magnets, the signal processor 52 and microcontroller 30 detect only changes in the strain on the ferromagnetic elements 40. The weight of the passenger is determined by determining when no passenger is present on the seating surface 36 and measuring the change in strain on the ferromagnetic element 40 as the passenger sits on seating surface 36.

It should be recognized that the signal processor 52 and its components could be replaced by software implemented by the microcontroller 30. Digital filters and comparators are well within the skill of the art. Further, it is anticipated that additional filters, smoothing functions, or algorithms in general would be implemented to account for transient changes in weight, such as the passenger shifting his weight.

Figure 2:
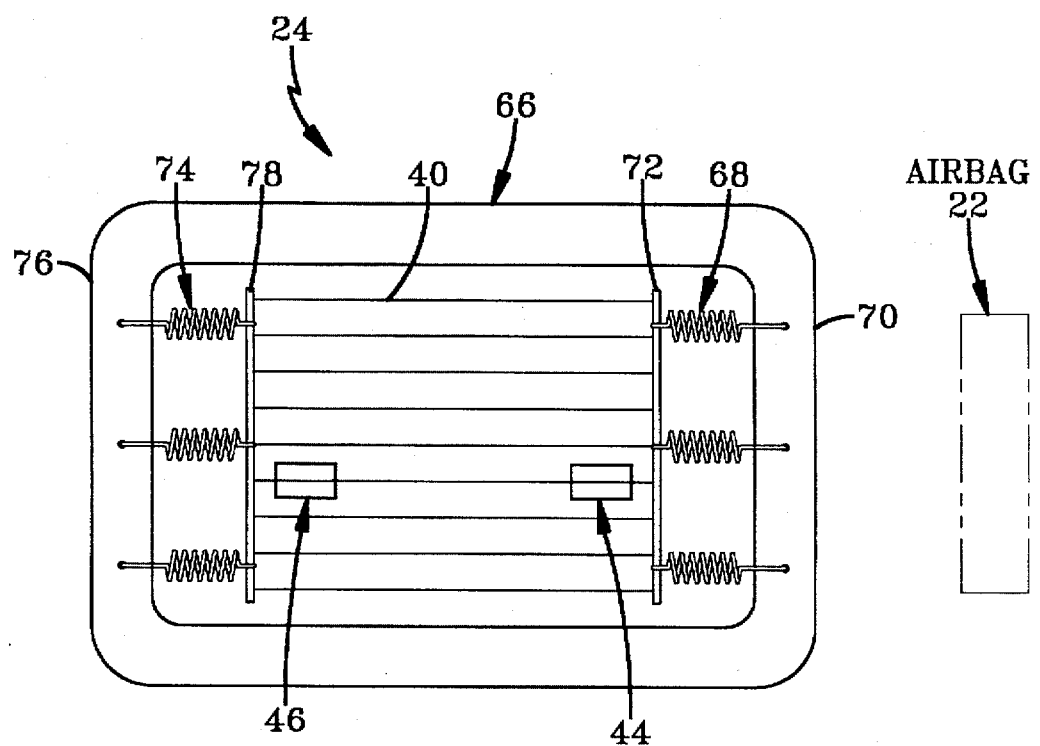
FIG. 2 is a sectional view taken along line 2—2 of FIG. 1 of the vehicle seat in FIG. 1.

The positioning of the sensors 44, 46 in the vehicle seat 24 is more particularly shown in FIG. 2. A known vehicle seat 24 generally comprises a seat frame 66 having a plurality of springs 68 attached at a forward end 70 of the seat frame 66 and connected to a rod 72. Complementary rearward springs 74 attached to a rearward end 76 of the seat frame 66 are also attached to a rod 78. The ferromagnetic elements 40, such as wires, are strung between the two rods 72, 78. Preferably, the sensors 44, 46 are positioned adjacent the same ferromagnetic element 40. The forward sensor 44 is positioned generally between the rearward sensor 46 and airbag 22. In this manner, the proximity of the passenger relative to the airbag 22 can be estimated.

Figure 3:
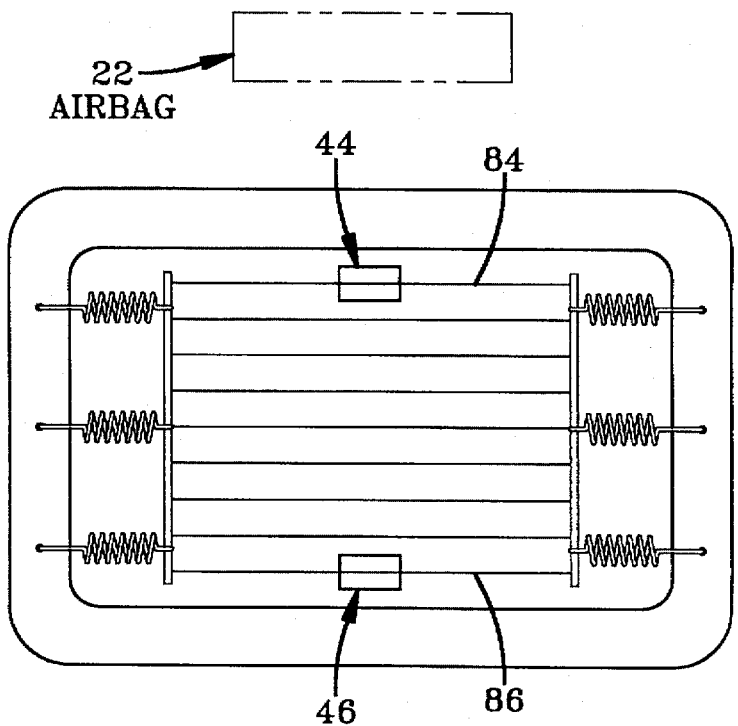
FIG. 3 is a sectional view similar to FIG. 2 of an alternate seat frame structure.

FIG. 3 shows the positioning of the sensors 44, 46 where the orientation of the seat frame 66 relative to the airbag 22 is rotated 90° from that shown in FIG. 2. In this case, the forward sensor 44 is preferably mounted adjacent a forward ferromagnetic element 84 and the rearward sensor 46 is preferably mounted adjacent a rearward ferromagnetic element 86. In any configuration, the forward sensor 44 is preferably located forward of the rearward sensor 46, wherein the term "forward" indicates a direction generally toward the airbag 22.

Figure 4:
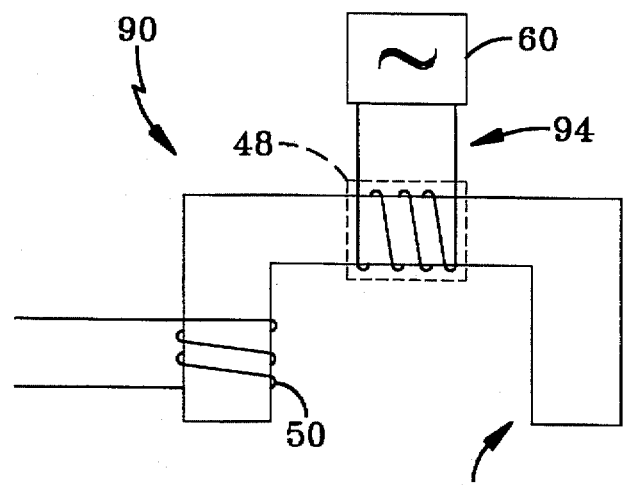
FIG. 4 is a schematic view of an active sensor which can be used as the sensor of FIG. 1.

FIG. 4 illustrates a sensor 90 which can be used as the forward and rearward sensors 44, 46 in FIG. 1. The sensor 90 generally comprises a ferrite core 92 having an excitation coil 94 which when driven by the function generator 60 forms the magnet 48. The sensor 90 further includes a coil 50 which is also preferably coiled about the ferrite core 92.

Figure 5:
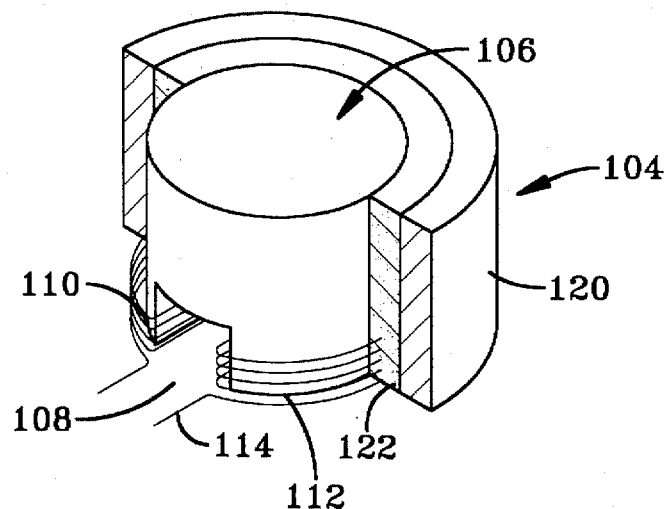
FIG. 5 is a perspective view partially broken away of a passive sensor which can be used as the sensor in FIG. 1.
Figure 6:
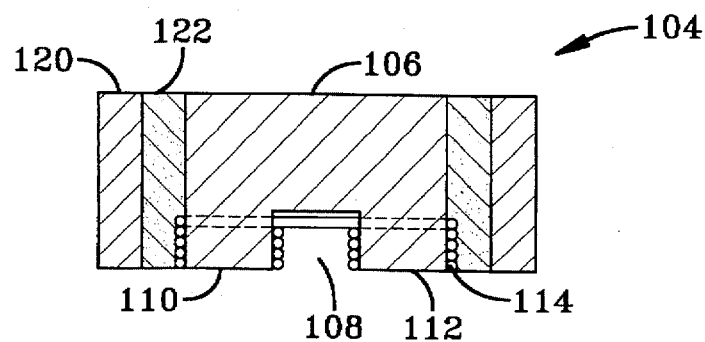
FIG. 6 is a sectional view of the sensor of FIG. 5.

FIGS. 5 and 6 show an alternate passive sensor 104 which can be used as the sensors 44, 46 in FIG. 1 with a permanent magnet 106. The permanent magnet 106 is generally cylindrical having a diametrically extending channel 108 forming a first leg 110 and a second leg 112. Wire 114 is coiled about the first leg 110 and subsequently about the second leg 112. The sensor 104 further includes a stainless steel casing 120 about an epoxy 122.

What is claimed is:

1. A system for measuring a weight upon a seating surface within a motor vehicle, said system comprising:

(a) a ferromagnetic element mechanically coupled to the seating surface such that strain is induced in said ferromagnetic element responsive to the weight thereon; and (b) a first sensor comprising (i) a magnet generating a magnetic field and (ii) an inductor, said magnet and inductor mounted on the vehicle adjacent said ferromagnetic element, said magnetic field altered by said strain in said ferromagnetic element, said inductor generating a signal based upon the alteration in said magnetic field.

2. The system of claim 1, wherein said magnet is a permanent magnet.

3. The system of claim 1, wherein said magnet is an electromagnet and said inductor includes a coil.

4. The system of claim 1, further including an actuator for a vehicle safety device, said actuator actuating said vehicle safety device based upon said signal from said first sensor.

5. The system of claim 4, further including a second sensor mounted adjacent said ferromagnetic element closer to said vehicle safety device than said first sensor, said actuator actuating said vehicle safety device based upon a signal from said first sensor and said second sensor and a comparison of said signals from said first sensor and said second sensor.

6. The system of claim 1, wherein said first sensor measures variation in strain in said ferromagnetic element.

7. The system of claim 1, further including a signal processor analyzing a third harmonic of said signal from said first sensor.

8. The system of claim 7, wherein said signal processor includes a filter.

9. A vehicle safety system comprising:

(a) a vehicle seat having a seating surface;

(b) a vehicle safety device positioned operatively with respect to said vehicle seat;

(c) crash detection circuitry generating a trigger upon detection of a sufficient impact to said vehicle;

(d) an actuator for actuating said vehicle safety device;

(e) a ferromagnetic element mechanically coupled to the seating surface such that strain is induced in said ferromagnetic element by weight on said seating surface; and (f) a first sensor mounted on the vehicle adjacent said ferromagnetic element and generating a magnetic field, said first sensor comprising a magnet and a first coil mounted on the vehicle adjacent said ferromagnetic element, said magnetic field generating an electromotive force voltage in said first coil, said electromotive force voltage being altered by an alteration in said magnetic field, said strain in said ferromagnetic element altering said magnetic field, said first sensor generating a signal based upon said alteration in said magnetic field, said actuator actuating said vehicle safety device based upon said signal from said first sensor and said trigger by said crash detection circuitry.

10. The system of claim 9, further including a second sensor mounted adjacent said ferromagnetic element closer to said vehicle safety device than said first sensor, said actuator actuating said vehicle safety device based upon said signal from said first sensor and a signal from said second sensor and a comparison of said signals from said first sensor and said second sensor.

11. The system of claim 9 further including a signal processor receiving said signal from said first sensor, said sensor generating an oscillating magnetic field having a frequency, said signal processor analyzing a third harmonic of said oscillating magnetic field.

12. The system of claim 9 wherein said actuator disables said vehicle safety device if said first sensor detects insufficient weight upon said seat surface.

13. A method for controlling actuation of a safety device in a motor vehicle based upon weight upon a seating surface coupled to a ferromagnetic element, said method comprising the steps of:

(a) generating an oscillating magnetic field adjacent the ferromagnetic element such that a portion of the ferromagnetic element falls within said magnetic field, the ferromagnetic element causing variations in said magnetic field based upon the weight upon said seating surface;

(b) detecting said variations in said magnetic field adjacent said ferromagnetic element and measuring variations in a harmonic of said oscillating field; and (c) actuating the safety device based upon the detected variation in said magnetic field.

14. The method of claim 13, further including the steps of:

detecting said variations in said magnetic field adjacent said ferromagnetic element at a first point;

detecting said variations in said magnetic field adjacent said ferromagnetic element at a second point closer to said safety device than said first point; and actuating said safety device based upon said detected variations at said first point and said second point and a comparison of said detected variations at said first point and said second point.

15. The method of claim 13, wherein step (b) further includes the act of measuring variations in a third harmonic of said oscillating field.

* * * * *